Nov. 20, 1962 C. C. DE PEW 3,065,011

CARGO RELEASE PIN ASSEMBLY

Filed March 28, 1960

3,065,011
CARGO RELEASE PIN ASSEMBLY
Chester C. De Pew, Farmingdale, N.Y., assignor, by mesne assignments, to Aerpat A.G., Glarus, Switzerland, a corporation of Switzerland
Filed Mar. 28, 1960, Ser. No. 18,101
7 Claims. (Cl. 287—119)

This invention relates to tension load couplings and, in particular, to couplings that can be released automatically when desired. The coupling of the invention is particularly adapted for anchoring cargo cables, lashings, and the like so that the cables can be released without requiring manual actuation of each coupling at the time of release.

It is an object of the invention to provide a tension coupling that can be locked in the coupled or engaged position so that it remains coupled regardless of the load thereon. A further object is to provide such a coupling that can be changed from a locking condition to a releasing condition while under load so that when the load is relaxed, the coupling will automatically release the attached cables.

It is an object of the invention to provide a device for coupling two elements which are loaded in tension, including first and second body members with first coupling means carried on the first body member and engageable with one of the elements, second coupling means carried on one of the body members, a coupling release member carried by the body members and being maintained in its locked position by the second coupling means, means for urging the coupling release member toward its unlocked position and moving the first coupling means to its unlocked position, and means for connecting the other loaded element to the second body means so that a tension load on the elements restrains the coupling release member when in its unlocked position.

It is an object of the invention to provide a device for coupling two elements loaded in tension having first and second body members with a pin detent, a pin and a pin spring carried on the first body member, a lock detent and a lock member carried on one of the body members, and a release member and a release spring carried between the body members, with the lock member when in its locking position maintaining the coupling engaged regardless of the load thereon and when in its releasing position permitting the release member to disengage the coupling automatically when the tension load is removed. A further object is provide such a structure wherein the pin detent and the lock detent may be of the ball lock type.

The invention also comprises novel details of construction and novel combinations and arrangements of parts, which will more fully appear in the course of the following description. The drawing merely shows and the description merely describes preferred embodiments of the present invention which are given by way of illustration or example.

Figure 1:
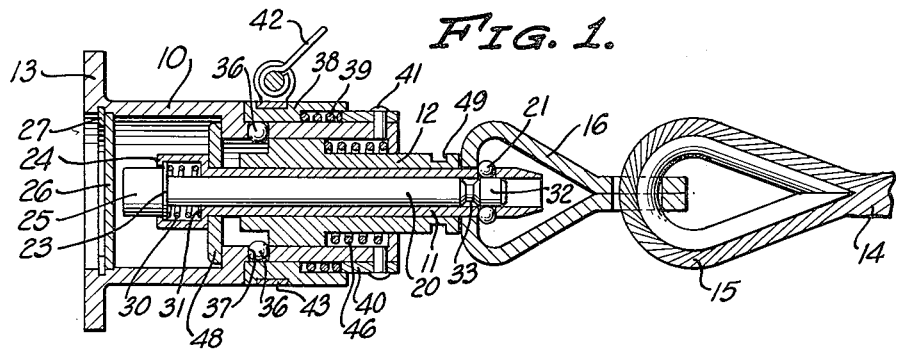
FIG. 1 is a sectional view of a preferred form of the invention shown in the locked condition.
Figure 2:
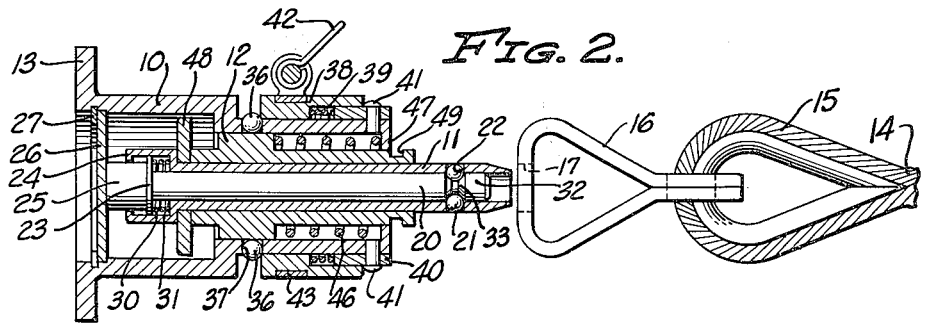
FIG. 2 is a sectional view of the embodiment of FIG. 1 shown in the disengaged condition.

The coupling of FIGS. 1 and 2 includes body members 10 and 11 to which the tension loads are applied. The body member 11 is slidably carried in a coupling release member 12 which, in turn, is slidable within the body member 10, permitting relative axial movement of the two body members. The body member 10 is designed for relatively permanent attachment to a tension element and is provided with a flange 13 that may be attached to a base by suitable means such as by welding or bolting. A coupling means is carried on the body member 11 for releasably engaging another load element, here shown as an active cable 14 terminated in an eye 15 and a V-shaped bracket 16 with the body member 11 passing through an opening 17 in the bracket.

The coupling means carried on the body member 11 for engaging the bracket 16 is preferably of the detent type, including a pin 20 carried in the body member for actuating the detent. A preferred form of detent is shown herein and includes a plurality of balls 21 positioned in corresponding lateral openings 22, the balls being movable inwardly and outwardly between an outer extended position as seen in FIG. 1 and an inner retracted position as seen in FIG. 2. The outer ends of the openings 22 are slightly closed as by staking or peening, so as to retain the balls in the body member. The pin 20 is movable in the body member between a locked position with a flange 23 of the pin engaging a rolled-over shoulder 24 of the body member, as shown in FIG. 1, and an unlocked position with a head 25 of the pin engaging a plate 26 fixed in the body member 10 by a snap ring 27, as shown in FIG. 2. A compression spring 30 is positioned around the pin 20 between the flange 23 and a shoulder 31 of the body member 11 urging the pin to the left as seen in FIG. 1, to the locked position.

The pin 20 has a peripheral section 32 of larger diameter for engaging the detent balls 21 and forcing them to their outer extended positions as seen in FIG. 1. An annular groove 33 of lesser diameter is positioned adjacent the section 32 for permitting the ball detents to move to the inner retracted position as seen in FIG. 2.

Another coupling means is carried on the body member 10 for controlling the release member 12, this coupling means also preferably being a detent of the ball type. In the preferred form shown herein, a plurality of balls 36 are positioned in corresponding lateral openings 37, the balls being movable inwardly and outwardly between an outer extended position, as seen in FIG. 2, and an inner retracted position as seen in FIG. 1. Both the inner and outer ends of the openings 37 are slightly closed, as by staking or peening, to retain the balls in the body member. A lock member or sleeve 38 is carried on the body member 10 and is movable between a locking position forcing the balls 36 to the inner retracted position, as seen in FIG. 1, and a releasing position at which the balls 36 are free to move to the outer extended position as seen in FIG. 2. A compression spring 39 may be positioned about the body member 10 between the lock member 38 and a ring 40 fixed to the body member by rivets 41, for urging the lock member to the locking position of FIG. 1. The lock member 38 may be moved to its releasing position from a remote location by a line (not shown) attached to a wire loop 42 fixed to a band 43 carried on the lock member.

A compression coil spring 46 is positioned between the release member 12 and an inturned shoulder 47 of the body member 10 urging the release member to the left to its unlocked position in engagement with a washer 48 carried on the body member 11, as seen in FIG. 2.

The coupling is shown locked in its engaged condition in FIG. 1. The pin spring 30 holds the pin 20 in its locked position with the balls 21 extended. The lock spring 39 holds the lock member in its locking position with the balls 36 retracted inwardly and these balls lock the release member 12 in its locked position against the force exerted by the release spring 46. While in this state, the coupling will remain engaged regardless of the tension load on the body members.

The coupling may be changed to the releasing condition but will remain engaged while sustaining a tension load. This is accomplished by moving the lock member 38 to the right to its releasing position, permitting the detent balls 36 to be moved outward by the release member 12 upon movement thereof by the spring 46. When the detent balls move outward, the release spring 46 moves the release member 12 to the left to its unlocked position. The release member 12 will now be engaging the washer 48 and urging the body member 11 to the left. However, the tension exerted on the coupling by the loads applied to the body members will maintain the body members in the position of FIG. 1 against the force exerted by the spring 46. Then when the tension load is reduced to a magnitude less than the force exerted by the spring 46, this spring will move the release member 12, the body member 11 and the pin 20 to the left relative to the body member 10 to the position shown in FIG. 2. Engagement of the pin 20 with the plate 26 compresses the pin spring 30, moving the pin relative to the body member 11 so that the balls 21 are free to move to their retracted position and release the bracket 16. Thus, it is seen that the coupling can be maintained engaged regardless of the load thereon and, alternatively, can be changed to a releasing condition so that it remains engaged only as long as a tension load is applied thereto.

The coupling is engaged by positioning the bracket 16 on the body member 11 and then compressing the spring 46 to move the release member 12 to the right and to a position where the detent balls 36 are free to move to their inner positions. An annular groove 49 may be provided in the release member 12 for gripping the release member to compress the spring 46. A simplified form of the coupling may be produced when the coupling is to be used only one time. The release member 12 may be terminated within the body member 10, and the coupling is assembled with the release member 12 in its locked position and with the lock member 38 in its locking position.

Figure 3:
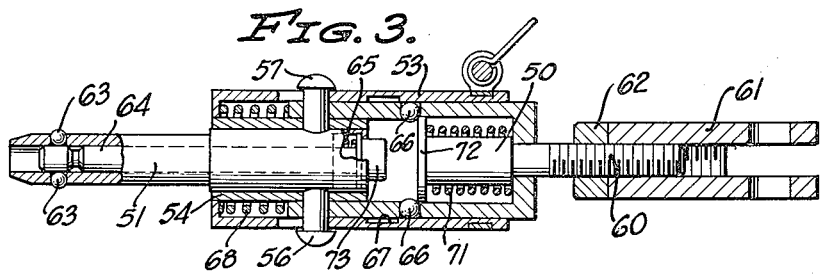
FIG. 3 is a sectional view of an alternative form shown in the locked condition.
Figure 4:
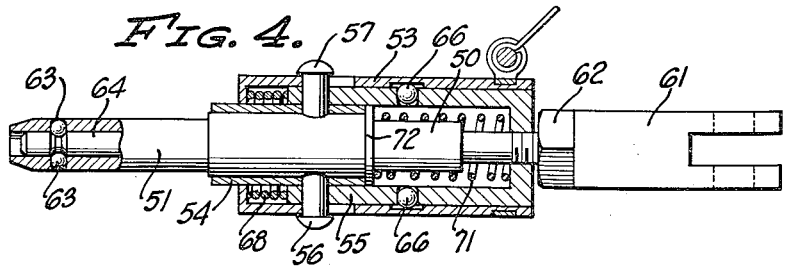
FIG. 4 is a view similar to that of FIG. 3 shown in the disengaged condition.

The alternative form of the invention shown in FIGS. 3 and 4 is similar to that of FIGS. 1 and 2 and includes body members, 50, 51 and a lock member 53. A separate release member is not required. The body member 51 includes sleeves 54, 55 fixed thereto by pins 56, 57 to form a unitary structure. The body member 50 is slidably positioned in the sleeve 55 of the body member 51 and includes a threaded section 60 for receiving a clevis 61 and lock nut 62 to which a tension load may be connected.

A quick release coupling of the detent type may be carried in the body member 51, including detent balls 63, a pin 64 and a pin spring 65. Another coupling including detent balls 66 may be carried in the sleeve 55 of the body member 51. The lock member 53 is slidable between a locking position which maintains the balls 66 in their inward position, as seen in FIG. 3, and a releasing position at which the balls 66 are free to move outward into an annular groove 67, as seen in FIG. 4. A lock spring 68 may be provided between a shoulder on the lock member 53 and the body member 51 for urging the lock member 53 to the locking position. A release spring 71 is positioned about the body member 50 between a flange 72 and the body member 51 for urging the body member 50 toward the unlocked position.

The operation of the coupling of FIGS. 3 and 4 is similar to that of FIGS. 1 and 2. With the lock member 53 in the locking position of FIG. 3, the body member 50 is maintained in its locked position, at which the pin spring 65 operates to maintain the pin 64 and the balls 63 in the locked position regardless of the tension load on the coupling. When the lock member 53 is moved to the releasing position of FIG. 4, the detent balls 66 are free to be moved to their extended positions by the flange 72 under the influence of the spring 71. Then when the tension load on the coupling is reduced, the spring 71 moves the body member 50 into engagement with the head 73 of the pin 64, compressing the pin spring and permitting the detent balls 63 to move inward and release the body 51 from the member to which it was previously attached. In this embodiment, the body member 50 also functions as the release member (12 in FIGS. 1 and 2), with the flange 72 serving as the release unit.

The coupling is engaged by compressing the spring 65, permitting the body member 51 to be inserted into a load element. Then the spring 71 is compressed, permitting the spring 68 to move the lock member 53 to the locking position.

Although exemplary embodiments of the invention have been disclosed and discussed, it will be understood that other applications of the invention are possible and that the embodiment disclosed may be subjected to various changes, modifications and substitutions without necessarily departing from the spirit of the invention.

I claim as my invention:

1. In a device for coupling two elements loaded in tension, the combination of: first and second body members disposed for relative axial movement; a pin detent carried adjacent one end of said first body member and movable inwardly and outwardly between inner retracted and outer extended positions, said pin detent projecting laterally from said first body member when in said extended position; a pin movable in said first body member between locked and unlocked positions and having means thereon for moving said pin detent outwardly into its extended position in locking engagement with one of the elements when said pin is in said locked position; a pin spring engaging said pin and said first body member and urging said pin toward said locked position; a lock detent carried on one of said body members and movable inwardly and outwardly between inner retracted and outer extended positions; a lock member carried on said one body member and movable between locking and releasing positions and having means thereon for moving said lock detent inward to its retracted position when said lock member is in its locking position; a release member carried by said one body member and movable between locked and unlocked positions and having means thereon for moving said lock detent outwardly into its extended position when said release member is in its unlocked position; a release spring engaging said release member and said one body member and urging said release member toward its unlocked position; and means for connecting the other element to said second body member, with said release spring, when said lock member is moved to its releasing position, moving said release member to its unlocked position to maintain said lock detent in its extended position, and then, when the tension load on the elements is relaxed, moving said second body member and said pin into engagement to compress said pin spring, move said pin to its unlocked position and release the one element.

2. In a device for coupling two elements loaded in tension, the combination of: first and second body members telescopingly disposed for relative axial movement; a pin detent carried adjacent one end of said first body member and movable inwardly and outwardly between inner retracted and outer extended positions, said pin detent projecting laterally from said first body member when in said extended position; a pin movable in said first body member between locked and unlocked positions and having means thereon for moving said pin detent outwardly into its extended position in locking engagement with one of the elements when said pin is in said locked position; a pin spring engaging said pin and said first body member and urging said pin toward said locked position; a lock detent carried on said second body member and movable inwardly and outwardly between inner retracted and outer extended positions; a lock sleeve carried on said second body member and movable between locking and releasing positions and having means thereon for moving said lock detent inward to its retracted position when said lock sleeve is in its locking position; a lock spring engaging said lock sleeve and said second body member and urging said lock sleeve toward its locking position; a release sleeve carried between said body members and movable between locked and unlocked positions and having means thereon for moving said lock detent outwardly into its extended position when said release sleeve is in its unlocked position; a release spring engaging said release sleeve and said second body member and urging said release sleeve toward its unlocked position; and means for connecting the other element to said second body member, with said release spring, when said lock sleeve is moved to its releasing position, moving said release sleeve to its unlocked position to maintain said lock detent in its extended position, and then, when the tension load on the elements is relaxed, moving said second body member and said pin into engagement to compress said pin spring, move said pin to its unlocked position and release the one element.

3. In a device for coupling two elements loaded in tension, the combination of: first and second body members telescopingly disposed for relative axial movement; a pin detent carried adjacent one end of said first body member and movable inwardly and outwardly between inner retracted and outer extended positions, said pin detent projecting laterally from said first body member when in said extended position; a pin movable in said first body member between locked and unlocked positions and having means thereon for moving said pin detent outwardly into its extended position in locking engagement with one of the elements when said pin is in said locked position; a pin spring engaging said pin and said first body member and urging said pin toward said locked position; a lock detent carried on said first body member and movable inwardly and outwardly between inner retracted and outer extended positions; a lock sleeve carried on said first body member and movable between locking and releasing positions and having means thereon for moving said lock detent inward to its retracted position when said lock sleeve is in its locking position; a lock spring engaging said lock sleeve and said first body member and urging said lock sleeve toward its locking position, said second body member including a release flange, with said second body member movable between locked and unlocked positions for moving said lock detent outwardly into its extended position when said lock sleeve is in its releasing position; a release spring engaging said release flange and said first body member and urging said second body member toward its unlocked position; and means for connecting the other element to said second body member, with said release spring, when said lock sleeve is moved to its releasing position, urging said second body member to its unlocked position and when the tension load on the elements is relaxed, moving said second body member and said pin into engagement to compress said pin spring, move said pin to its unlocked position and release the one element.

4. In a device for coupling two elements loaded in tension, the combination of: first and second body members telescopingly disposed for relative axial movement; a pin detent carried adjacent one end of said first body member and movable inwardly and outwardly between inner retracted and outer extended positions, said pin detent projecting laterally from said first body member when in said extended position; a pin movable in said first body member between locked and unlocked positions and having means thereon for moving said pin detent outwardly into its extended position in locking engagement with one of the elements when said pin is in said locked position; a pin spring engaging said pin and said first body member and urging said pin toward said locked position; a lock detent carried on said second body member and movable inwardly and outwardly between inner retracted and outer extended positions, said lock detent projecting laterally from said second body member when in said extended position; a lock sleeve carried on said second body member and movable between locking and releasing positions and having means thereon for moving said lock detent inward to its retracted position when said lock sleeve is in its locking position; a lock spring engaging said lock sleeve and said second body member and urging said lock sleeve toward its locking position; a release sleeve telescopingly positioned between said body members and movable between locked and unlocked positions and having means thereon for moving said lock detent outwardly into its extended position when said release sleeve is in its unlocked position; a release spring engaging said release sleeve and said second body member and urging said release sleeve toward its unlocked position and into engagement with said first body member; and means for connecting the other element to said second body member, with said release spring, when said lock sleeve is moved to its releasing position, moving said release sleeve to its unlocked position to maintain said lock detent in its extended position, and then, when the tension load on the elements is relaxed, moving said release sleeve and said first body member to engage said pin with said second body member, to compress said pin spring and release the one element.

5. In a device for coupling two elements loaded in tension, the combination of: first and second body members telescopingly disposed for relative axial movement; a pin detent carried adjacent one end of said first body member and movable inwardly and outwardly between inner retracted and outer extended positions, said pin detent projecting laterally from said first body member when in said extended position; a pin movable in said first body member between locked and unlocked positions and having means thereon for moving said pin detent outwardly into its extended position in locking engagement with one of the elements when said pin is in said locked position; a pin spring engaging said pin and said first body member and urging said pin toward said locked position; a lock detent carried on said first body member and movable inwardly and outwardly between inner retracted and outer extended positions, said lock detent projecting laterally from said first body member when in said extended position; a lock sleeve carried on said first body member and movable between locking and releasing positions and having means thereon for moving said lock detent inward to its retracted position when said lock sleeve is in its locking position; a lock spring engaging said lock sleeve and said first body member and urging said lock sleeve toward its locking position, said second body member having a release flange, with said second body member movable between locked and unlocked positions for moving said lock detent outwardly into its extended position when said lock sleeve is in its releasing position; a release spring engaging said release flange and said first body member and urging said second body member toward its unlocked position; and means for connecting the other element to said second body member, with said release spring, when said lock sleeve is moved to its releasing position, urging said second body member to its unlocked position and when the tension load on the elements is relaxed, moving said second body member to engage said pin, compress said pin spring, and release the one element.

6. In a device for coupling two elements loaded in tension, the combination of: first and second body members disposed for relative axial movement; a pin detent carried adjacent one end of said first body member and movable inwardly and outwardly between inner retracted and outer extended positions, said pin detent projecting laterally from said first body member when in said extended position; a pin movable in said first body member between locked and unlocked positions and having means thereon for moving said pin detent outwardly into its extended position in locking engagement with one of the elements when said pin is in said locked position; a pin spring engaging said pin and said first body member and urging said pin toward said locked position; a lock detent carried on one of said body members and movable inwardly and outwardly between inner retracted and outer extended positions; a lock member carried on said one body member and movable between locking and releasing positions and having means thereon for moving said lock detent inward to its retracted position when said lock member is in its locking position, the other of said body members including a release unit movable between locked and unlocked positions and having means thereon for moving said lock detent outwardly into its extended position when said release unit is in its unlocked position; a release spring engaging said release unit and said one body member and urging said release unit toward its unlocked position; and means for connecting the other element to said second body member, with said release spring, when said lock member is moved to its releasing position, permitting said release unit to move to its unlocked position, and when the tension load on the elements is relaxed, moving said second body member and said pin into engagement to compress said pin spring, move said pin to its unlocked position and release the one element.

7. In a device for coupling two elements loaded in tension, the combination of: first and second body members disposed for relative axial movement; first coupling means carried adjacent one end of said first body member, with said first coupling means movable in said first body member between locked and unlocked positions and being engageable with one of the elements in load carrying relation when in said locked position; second coupling means carried on one of said body members, with said second coupling means movable between locking and releasing position; a coupling release member carried by said body members and movable between locked and unlocked positions, with said second coupling means in its locking position maintaining said coupling release member in its locked position; means for urging said coupling release member toward its unlocked position and urging said second body member and said first coupling means into engagement to move said first coupling means to its unlocked position; and means for connecting the other element to said second body member in load carrying relation, with a tension load on the elements restraining said coupling release member when in its unlocked position.

References Cited in the file of this patent

UNITED STATES PATENTS

| 2,562,459 | Hoey | July 31, 1951 |
| 2,729,495 | De Jean | Jan. 3, 1956 |
| 2,837,370 | Stott et al. | June 3, 1958 |